(No Model.)
R. W. WELCH.
GRAIN SCOURING MACHINE.
No. 480,942. Patented Aug. 16, 1892.
Fig. 1.
sec. on line 2-2.
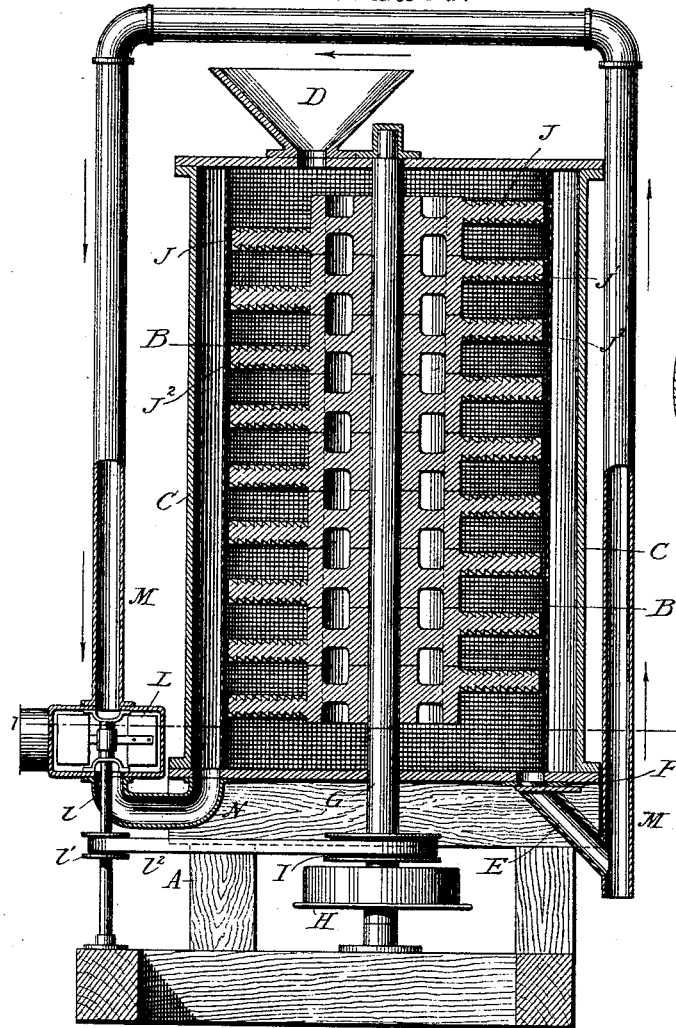
Fig. 3.
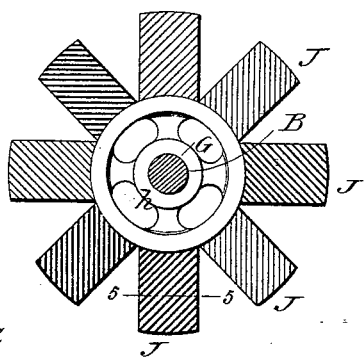
Fig. 4.
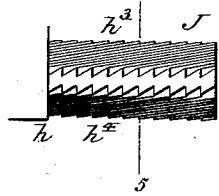
Fig. 5.
on line 5-5.
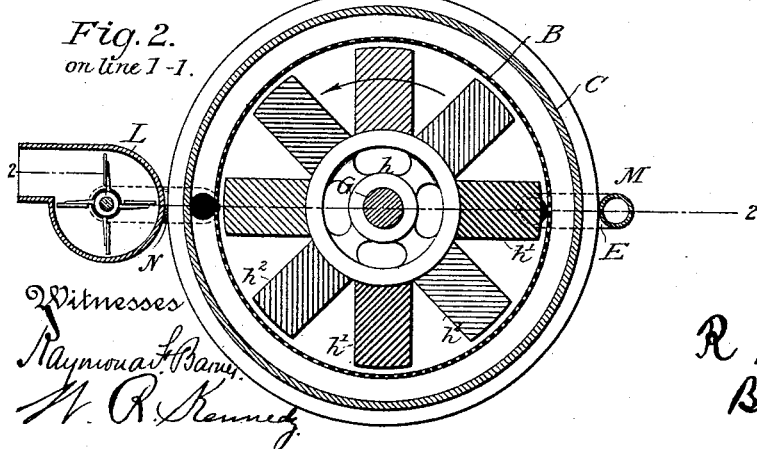
Fig. 2.
on line 1-1.
Witnesses
Raymond F. Barry
W. R. Kennedy
Inventor
R. W. Welch
By P. T. Dodge
Attorney

UNITED STATES PATENT OFFICE.

ROSIA W. WELCH, OF BALTIMORE, MARYLAND, ASSIGNOR OF TWO-THIRDS TO WILLIAM A. DUNN AND LOUIS D. PASSANO, OF SAME PLACE.

GRAIN-SCOURING MACHINE.

SPECIFICATION forming part of Letters Patent No. 480,942, dated August 16, 1892.

Application filed November 13, 1891. Serial No. 411,833. (No model.)

*To all whom it may concern:*

Be it known that I, ROSIA W. WELCH, of the city of Baltimore and State of Maryland, have invented a new and useful Improvement in Grain-Scouring Machines, of which the following is a specification.

My invention relates to a machine intended for treating wheat, rice, and other grains to detach and remove adhering dirt and fibers and to separate light seeds and other impurities therefrom.

To this end I combine with an upright pervious cylinder and a surrounding exhausted jacket or chamber a central vertical shaft carrying scouring-blades which are shaped and toothed in a peculiar manner that they may efficiently scour and agitate the grain and maintain a constant circulation of the same that every portion of the mass may be presented repeatedly to the pervious jacket to permit the escape of the dust and other foreign matters.

In the accompanying drawings, Figure 1 is a central cross-section of the machine, constructed in accordance with my invention. Fig. 2 is a horizontal cross-section on the line 2 2 of Fig. 1. Fig. 3 is a top plan view of a portion of the scourers. Fig. 4 is a side view of the same. Fig. 5 is a cross-section on the line 5 5 of Figs. 3 and 4.

Referring to the drawings, A represents a rigid main frame; B, an upright cylinder of wire-gauze or perforated metal, fixed in place in the frame; C, a fixed jacket or casing encircling the cylinder in such manner as to leave between them an air-space closed at the top and bottom.

D is a hopper for delivering the seed into the top of the cylinder, and E a discharge-spout at the bottom, provided with a gate F of any suitable character to control the speed at which the grain descends through the machine and maintain at all times a solid column of grain within the cylinder. By means of this gate the duration of the scouring treatment may be prolonged and varied at will, as circumstances may demand.

G represents a shaft extending centrally through the cylinder from top to bottom and seated in bearings in the frame, its lower end being provided with a driving-pulley by which it is turned constantly at a high speed.

J J J, &c., represent a series of scourers fixed on the shaft and each consisting of a central hub provided with a series of rigid outreaching arms or blades $h$ $h$, &c. The blades of each hub extend radially, or practically so, and are arranged at different levels, being placed successively above and below the median line. Each blade is of increasing thickness from front to rear, as shown in cross-section in Fig. 5, so that in advancing through the mass of grain with a wedge-like action it spreads or opens the same vertically, and then allows it to close again by flowing over the sharp rear corners of the blade under pressure. Each blade has its upper and lower surfaces formed with obliquely-arranged teeth $h^3$ $h^4$, or, in other words, with teeth which lie across the blade obliquely to radial lines from front to rear. The teeth on one face of the blade extend rearward and inward toward the center, while those on the other face are extended rearward and outward. The arrangement of teeth on the successive blades is usually reversed, as shown. In cross-section the teeth on the two faces incline in opposite directions—that is to say, those on one face of the blades present vertical or practically vertical front walls and sharp edges while those on the other face present walls which incline backward from the front and then fall suddenly away at the rear. The heels of the scourers are adapted to rest one upon another, as shown, whereby the blades are properly spaced apart vertically and the annular grain-space reduced to keep the thickness of the column within proper limits.

An exhaust-fan L is mounted on one side of the frame and communicates with the air-space around the pervious cylinder and also through trunk M with the delivery-spout.

In operating the machine the cylinder is kept constantly full of grain and the gate so adjusted as to permit the same to descend slowly and the scourers driven at a speed of from four to five hundred revolutions per minute. The blades and their teeth serve to scour and agitate the grain and rub the kernels or berries against each other in such manner that all adhering matters are loosened and detached. The reversely-inclined or oblique teeth have in connection with the external pervious cylinder and exhaust-fan a peculiar and very advantageous effect, since they maintain a constant circulation or flowing of the grain to and from the center. While being agitated and swept around by the blades the one set of teeth crowd the same outward strongly toward the cylinder, so that each kernel is rubbed against the pervious surface and then drawn inward again that another may take its place. In this manner the dust, fluff, and other foreign matters are carried constantly outward with the grain, so that they may escape through the cylinder at once on being detached. This immediate removal of the foreign matters permits the grain to be treated much more quickly and efficiently than would otherwise be possible.

Having thus described my invention, what I claim is—

1. The combination of the pervious cylinder, the surrounding casing, and the fan arranged to exhaust the casing, in combination with the central shaft, and the scourer-blades having obliquely and reversely arranged teeth, as described, the forward or working faces of the teeth standing at a greater angle to the plane of the blades than the rear faces, whereby the grain is caused, in addition to its other movements, to flow inward and outward to carry the free foreign matters to the pervious cylinder that they may speedily escape.

2. In a grain-scouring machine, the pervious cylinder, the jacket, the exhaust-fan, and the delivery-controlling gate, in combination with the central shaft and the hubs, each having at different levels blades constructed of increasing thickness from front to rear with reversely-arranged olique teeth on their upper and under sides, the forward or working faces of the teeth standing at a greater angle to the plane of the blade than the rear faces.

3. In a grain-scourer, and in combination with a surrounding cylinder, rotary blades each having obliquely-arranged teeth, those on one face with vertical front walls or surfaces and those on the other face with backwardly-inclined front surfaces.

In testimony whereof I hereunto set my hand this 7th day of November, 1891, in the presence of two attesting witnesses.

ROSIA W. WELCH.

Witnesses:
EDW. RAINE.
P. JOHANNSEN.